United States Patent [19]

Uffindell

[11] Patent Number: 5,050,289
[45] Date of Patent: Sep. 24, 1991

[54] HANDLE GRIP

[75] Inventor: Paul J. Uffindell, Morrow, Ohio

[73] Assignee: 'totes', incorporated, Loveland, Ohio

[21] Appl. No.: 504,980

[22] Filed: Apr. 5, 1990

Related U.S. Application Data

[63] Continuation of Ser. No. 405,900, Sep. 12, 1989.

[51] Int. Cl.⁵ .............................................. B23P 11/02
[52] U.S. Cl. ................................................... 29/450
[58] Field of Search ............ 29/450; 16/111 R, 111 A, 16/DIG. 12; 74/551.9; 273/67 DB, 72 R, 72 A, 75, 81-81.6; D8/83, 107

[56] References Cited

U.S. PATENT DOCUMENTS

| | | | |
|---|---|---|---|
| D. 271,841 | 12/1983 | Hansen | D8/107 X |
| D. 278,879 | 5/1985 | Hwung | 16/111 R X |
| 1,133,622 | 1/1915 | Darling | 273/75 |
| 1,165,484 | 12/1915 | Zimmerman | 273/72 R |
| 2,046,191 | 6/1936 | Smith | 273/81.4 |
| 2,201,706 | 5/1940 | Sukohl | 156/160 |
| 2,984,486 | 5/1961 | Jones | 273/72 R |
| 3,020,192 | 2/1962 | Stepens et al. | 156/423 |
| 3,606,326 | 9/1971 | Sparks et al. | 273/81 R |
| 4,016,640 | 4/1977 | Briggs | 29/450 |
| 4,134,198 | 1/1979 | Briggs | 29/450 |
| 4,677,872 | 7/1987 | Nishida et al. | 16/12 X |

Primary Examiner—Joseph M. Gorski
Attorney, Agent, or Firm—Wood, Herron & Evans

[57] ABSTRACT

The invention pertains to a method of installing a grip on a hand held implement. The method includes the steps of providing a grip with a tubular body, closed end, open end, and cup-shaped flange about the open end, deforming the flange so that is is spaced from the tubular body and forms a gap therewith; stretching the flange over a collar of a vacuum chamber; exposing the grip to a vacuum; inserting the hand held implement into the grip; releasing the vacuum; and then severing the cup-shaped flange from the grip.

3 Claims, 1 Drawing Sheet

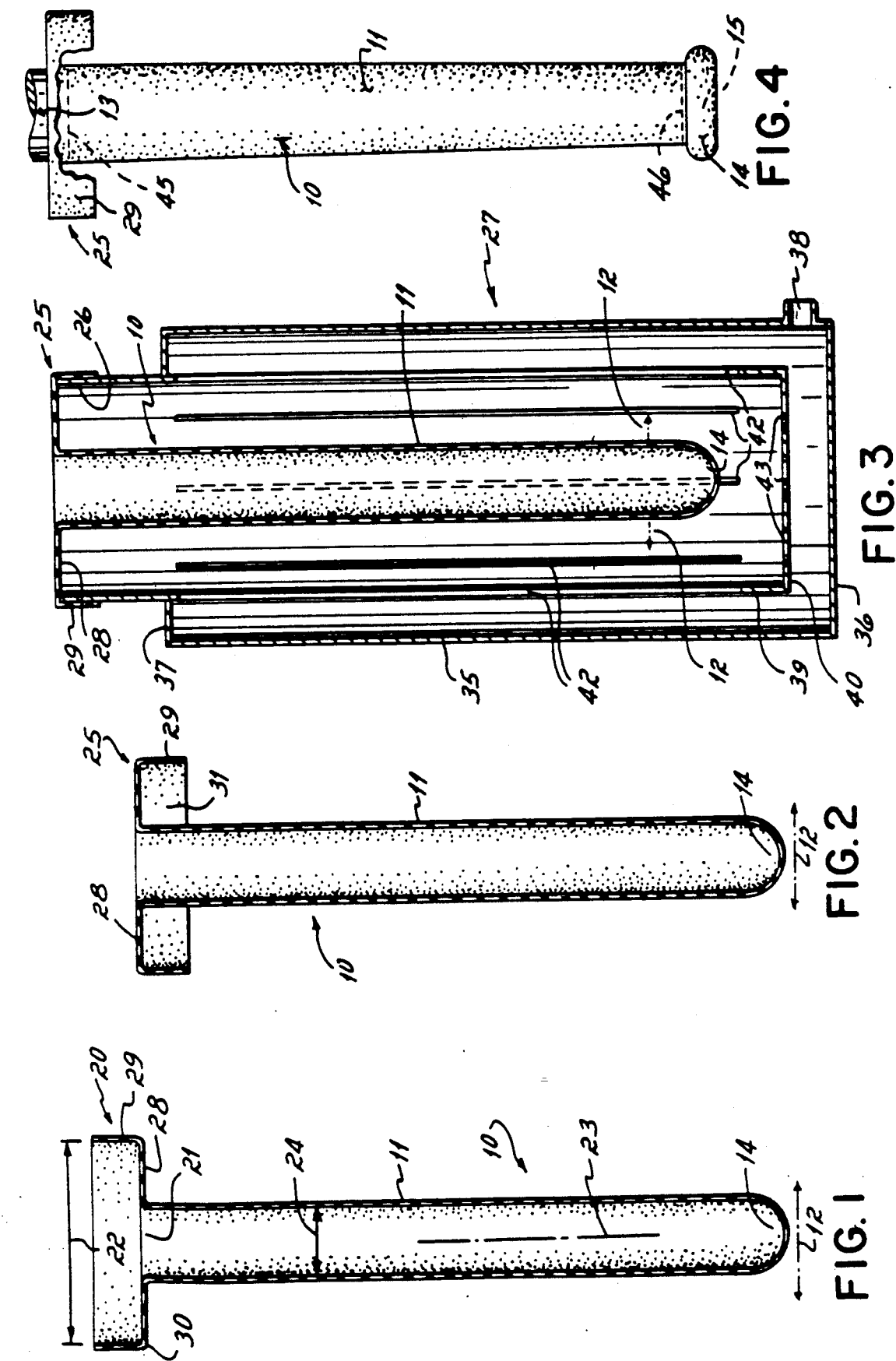

HANDLE GRIP

This is a continuation of application Ser. No. 405,900, filed Sept. 12, 1989.

This invention is directed to hand held implements. More particularly, this invention is directed to a unique grip for hand held implements, and to a unique method of fabricating and installing same.

There are, of course, numerous different hand held implements in use throughout the country today. Hand held implements basically fall into two classes. The first class includes those used for work, and the second class includes those used for pleasure. In the first class are small hand tools such as screwdrivers, hammers, chisels, wrenches, pliers and the like, and large hand tools such as rakes, hose, pruning shears, shovels, wheelbarrow handles and the like. The second class mainly includes sporting good equipment such as baseball bats, golf clubs, tennis rackets, paddle tennis handles, badminton racquets, hockey sticks, canoe paddles and the like. There are certain common basic structural characteristics to each of these hand held implement, from the standpoint of this invention. First, the implement's handle must be generally linear (although not necessarily absolutely straight, as a curved handle may be used) in configuration from one end to the other. Second, one end of the handle must be connected to the working head of the implement, but the other end must not be connected to the implement's working head, and such a handle is hereinafter referred to as a free end handle. And third, the free end handle's external girth and cross-sectional area may vary from one end to the other depending on the implement under review, and that handle also may be symmetrical or asymmetrical along its longitudinal axis from one end to the other.

A handle grip for a hand held implement and, particularly, for a baseball bat, that has seen significant commercial success in the marketplace is that illustrated in U.S. Pat. Nos. 4,016,640 and 4,134,198. The handle grip illustrated in these patents is Comprised of a thin walled tubular member open at one end, and a boot integral with the tubular member that closes its other end. The handle grip, which has a novel exterior gripping surface, is produced by dipping a male mandrel into an elasteromeric latex and, thereafter, curing the latex skin on the mandrel prior to stripping off of the grip from the mandrel. The grip is installed on a baseball bat's handle by creating a pressure differential between the interior and exterior of the grip, i.e , by exposing it to a vacuum, thereby causing the grip to stretch radially outward from its longitudinal axis. This stretching step allows the bat's handle to be inserted through the grip's open end until the handle's free end bottoms out in the grip's boot. Subsequently the vacuum is released, thereby causing the grip to stretch into a tight friction fit with the handle.

In the bat grip illustrated in the above-mentioned patents, the grip itself, prior to installation on the baseball bat's handle, is of a cylindrical cross-sectional configuration from one end to the other except at the closed end where a knob-shaped boot is formed integral with the tubular grip. The open end of the tubular grip, upon being made ready installation with a baseball bat, must be stretched significantly and cuffed over the open end of a vacuum chamber. This initial stretching or cuffing step of the grip over the vacuum chamber's collar in order to seal the chamber is difficult when the tubular grip is of a small cross-sectional area. In other words, the smaller the cross-sectional area or diameter of the tubular grip, the more difficult it is for a user to manually hold and then stretch the open end of it so as to create a cuff that allows the grip to be installed over a vacuum chamber's collar. This may be particularly the case where, in practice, a standard sized vacuum chamber is used, but the cross-sectional area of the tubular hand grip varies because of the different size handles and different size grips with which it is adapted to be used.

Accordingly, it is the primary objective of this invention to provide an improved grip for the handle of a hand held implement where the open end of the thin walled stretchable tubular member that comprises that grip is provided with a structural feature which makes it relatively easy to install over the collar of a vacuum chamber during installation of the grip on the handle.

In accord with this objective, the improved grip of a hand held implement of this invention includes a grip for the handle of a hand held implement of the type that is comprised of a thin wall stretchable tubular member radially stretchable upon exposure to a vacuum which allows for insertion of a handle, the tubular member being sized and configured to contract into a tight friction fit with the handle when the vacuum is released. With this type grip, an outwardly flaring generally cup-shaped flange is formed integral with the tubular member at an open end. The flange has a maximum radial dimension relative to the tubular member's longitudinal axis, at least twice the minimum radial dimension of the tubular member. The flange is sized and configured so that its outer periphery can be provided with a stable cuff, that stable cuff being stretchable over a collar on a vacuum chamber without significantly stretching the tubular member during installation of the grip on the handle.

Other objectives and advantages will be apparent from the following detailed description taken in conjunction with the drawings in which:

FIG. 1 is a side elevational view of an improved grip for a baseball bat in accord with the principles of this invention, the grip being shown in its as-produced form;

FIG. 2 is a view similar to FIG. 1, the grip being shown in an intermediate configuration prior to installation on a baseball bat handle; and FIG. 3 is a side elevational view of the grip as configured in FIG. 2, but installed with a vacuum chamber, and FIG. 4 is a side view of the grip installed on a baseball bat handle and illustrating the manner in which the grip's cuff portion is removed from the grip.

An improved bat grip 10 in accord with the principles of this invention is illustrated in FIG. 1 in the as-manufactured condition. The bat grip 10 includes a thin walled stretchable tubular member 11 that is of a circular cross-sectional configuration. The member 11 is stretchable radially as shown by phantom arrows 12 in response to exposure to a vacuum which allows for insertion of a baseball bat's handle 13 in the grip when it is so stretched. The tubular member 11 is sized and configured to contract into a tight friction fit with the bat's handle 13. A boot 14 is formed integral with the tubular member 11 at one end. The boot 14 is adapted to receive the handle's free end 15 therein, and in effect closes off the tubular member 11 at one end.

The structural feature to which this invention is directed is an outwardly flaring generally cup-shaped flange 20 formed integral with the tubular member at its open end 21. The flange 20 has an outer radial dimension 22 relative to the tubular member's longitudinal axis 23 at least twice the minimum radial dimension 24 of the tubular member 11 itself.

The flange 20 is sized and configured so that its outer periphery can be provided with a stable inverted cuff 25, as shown in FIG. 2. The stable cuff 25 is stretchable over a collar 26 on a vacuum chamber 27 without significantly stretching the tubular member 11 during installation of the grip 10 on the handle 13 as explained in further detail below. The outwardly flaring cup-shaped flange 20 includes an annular floor 28 joined integral with the tubular member 11. The floor 28 extends generally radially outward of the tubular member relative to its longitudinal axis 23. An annular rim 29 is joined integral with the floor at the flange's shoulder 30. The rim 29 initially extends beyond the open end 21 of the tubular member 11 in the as-manufactured condition illustrated in FIG. 1. The cup-shaped flange 20 is structured so as to be invertable at its shoulder 30. When so inverted, the flange's rim 29 forms a stable cuff 25 relative to the tubular member 11. The cuff 25 is spaced from the tubular member 11 in a stable configuration to form an annular gap 31 having a width about equal to the width of the annular floor. The width of this gap 31 is preferably at least one half the minimum radial dimension of the tubular member 11.

A method for fabricating this grip 10, as well as the preferred physical characteristics of the grip from a stretchability standpoint, are disclosed in U.S. Pat. Nos. 4,016,640 and 4,134,198, the entire disclosures of which are incorporated herein by reference.

The bat grip 10 illustrated in FIG. 1 and 2 is installed on a baseball bat's handle 13 by a vacuum chamber 27 schematically illustrated in FIG. 3. The vacuum chamber structure disclosed in the above-mentioned U.S. Pat. Nos. 4,016,640 and 4,134,198 is similarly incorporated herein by reference. The vacuum chamber 27 basically includes an outer tube 35 closed at its bottom end by a floor 36, and at its top end by a ceiling 37. The outer tube 35 includes a vacuum port 38 having a fitting adapted to be connected to a standard vacuum pump (not shown). An inner tube 39 is disposed within the closed outer tube 35 co-axially with the outer tube. The inner tube 39 is elevated at its bottom end 40 above the floor 36 of the outer tube 35, and is of an overall length that permits it to extend out of the outer tube ceiling 37 at its top end 41. The inner tube 39 has a plurality of slots as at 42 on that portion interiorly of the outer tube 35. Floor 40 of the inner tube also is provided with holes 43. Thus, that portion of the inner tube's wall 39 and floor 40 which are inside the outer tube 35 are air permeable, i.e., not air tight.

With the outwardly flaring generally cup-shaped flange 20 cuffed into the FIG. 2 attitude, the cuff thereformed is then stretched over the exposed top end or collar 26 of the vacuum chamber's inner tube 39. This stretching occurs mainly in the floor area 28 of the flange, and does not materially stretch the tubular member 11, thereby making it much easier for the user to install the FIG. 2 cuffed hand grip over the vacuum chamber's collar 26. After the grip 10 has been cuffed onto the vacuum, tube's collar 26, a pressure differential is created between the interior and the exterior of the grip sufficient to expand the grip into an internal girth throughout its longitudinal length which is substantially greater than the handle 13 of a baseball bat.

After the bat's handle 13 has been installed or inserted into the expanded grip 10, the vacuum is released so that the grip simply contracts onto the bat's handle. The flange 20 is then uncuffed from the collar 26 of the vacuum chamber 27. Thereafter, and as shown in FIG. 4, the flange 20 on the bat is removed from the bat's handle 13 simply by slicing with a sharp knife or the like a peripheral slice in the direction shown by dashed line 45 around the circumference of the bat's handle and the boot 14 is similarly removed along the dashed line 46. This separates the cup-shaped flange 20 and the boot 14 from the tubular primary member 11 of the grip, and allows the flange and boot to simply be pulled off the handle and discarded.

Having described in detail the preferred embodiment of my invention, what I desire to claim and protect by Letters Patent is:

1. A method of installing a grip on a hand held implement, said implement having a handle with a free end, said method comprising the steps of:

providing said grip with a thin walled stretchable tubular member open at one end and closed at the other end by a boot formed integral therewith, said tubular member having a longitudinal axis, providing the open end of said tubular member with an outwardly flaring generally cup-shaped flange formed integral therewith, said cup-shaped flange having an annular floor extending generally radially outward of said tubular member relative to said longitudinal axis, and an annular rim joined with said floor at a shoulder located at an outer edge of said floor, deforming said rim relative to said tubular member at said shoulder, thereby spacing said rim from said tubular member, and thereby forming an annular gap having a width about equal to the width of said floor, stretching said rim over a collar of a vacuum chamber after inserting said tubular member in said chamber, exposing said tubular member to a vacuum, thereby expanding said member throughout its length, and inserting said free end of said handle therein, releasing said vacuum, thereby contracting said tubular member into a friction fit with said handle, and thereafter severing said cup-shaped flange from said tubular member, and removing said cup-shaped flange from said handle, thereby leaving said grip in friction fit relation with said hand held implement throughout the length of said grip.

2. The method of installing a grip on a hand held implement as claimed in claim 1, further comprising the step of:

severing said boot from said tubular member after said vacuum is released, and removing said boot from said handle.

3. The method of installing a grip on a hand held implement as claimed in claim 1, said hand held implement being one selected from the group consisting of a baseball bat, a tennis racquet and a golf club.

* * * * *